Feb. 14, 1967  D. G. ELLIS  3,303,730
PIPE TOOL
Filed July 2, 1965
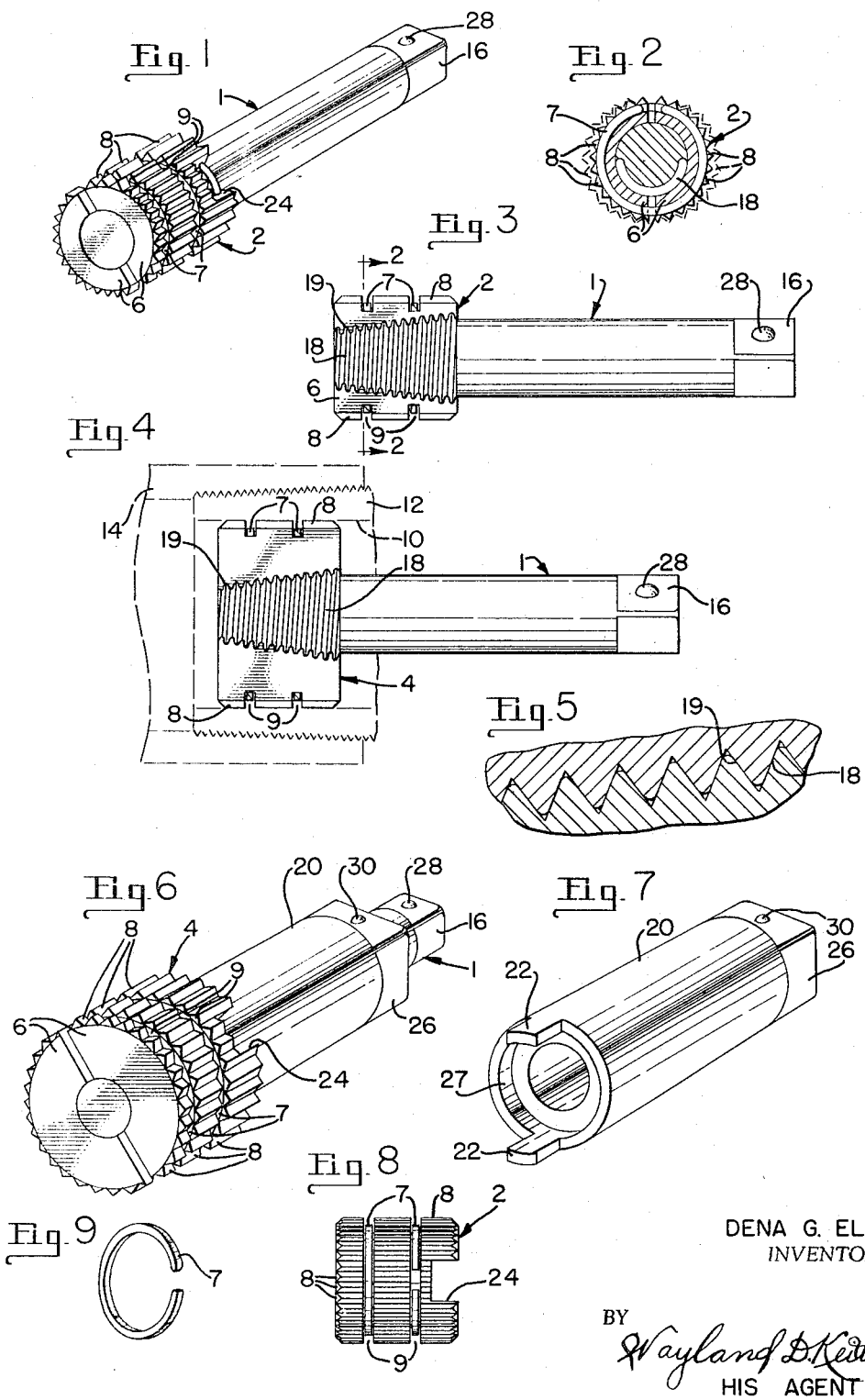
DENA G. ELLIS
INVENTOR.
BY
Wayland D. Keith
HIS AGENT

# United States Patent Office 3,303,730
Patented Feb. 14, 1967

3,303,730
PIPE TOOL
Dena G. Ellis, P.O. Box 985, Jacksboro, Tex. 76056
Filed July 2, 1965, Ser. No. 469,090
2 Claims. (Cl. 81—72)

This invention relates to pipe tools and more particularly to a tool for removing pipe from recessed places, particularly pipe which has become broken within a pipe fitting which pipe is not accessible for removal by conventional wrenches and the like. The present tool is also so constructed as to enable the screwing of pipe into recessed places in which other tools are not adapted to work.

The present tool provides an internally threaded, expansible segmental head which may be expanded by a complementary tapered thread on a mandrel so the expansible, segmental head will engage the interior of a pipe; and when in properly engaged relation therewith, a sleeve is engaged with the expansible, segmental head to rotate the expansible, segmental head without further expanding the head, to enable the removal of or insertion of pipe nipples and the like in places remote from the surface and which are inaccessible for the use of a wrench of the usual type.

Various tools have been proposed to perform operations of this character; however most of these had certain shortcomings that did not readily lend themselves to use by plumbers, pipe fitters, and home repairmen.

The present tool is so constructed that it may be made to fit a variety of sizes of pipe and which is of a size to readily fit within a workman's tool kit, without adding undue weight or bulk. Furthermore, the tool is so constructed that it may be used under rugged conditions with a minimum of wear and breakage. The tool is so constructed that it may be readily changed from one size of pipe to another in a minimum of time and with a minimum of loose pieces.

An object of this invention is to provide a tool which may be readily inserted into the end of a pipe to be removed, the tool is then expanded in such manner as to enable the removing of a pipe, or a portion thereof, without injury to the pipe fitting from which the pipe or portion thereof is being removed.

Another object of the invention is to provide an expansible pipe removing tool which will enable the unscrewing of broken threaded ends of pipe from pipe fittings with a minimum of inconvenience.

Still another object of the invention is to provide a tool for removing pipe portions which have been broken off in fittings, which tool will readily expand to the desired gripping degree as the pipe portion is being removed from the fitting.

Still another object of the invention is to provide a pipe tool which may be inserted into a pipe and expanded so a serated cylindrical surface will engage the interior of the pipe to enable quick and efficient removal of the pipe portion.

Still another object of the invention is to provide a tool for insertion into a pipe, which tool may be expanded to a desired degree and whereby the tool may be turned in either direction without contracting or expanding the pipe engaging elements.

Still another object of the invention is to provide a pipe tool for turning a portion of, heretofore inaccessible pipe, which is simple is construction, easy to use and relatively low in cost of manufacture.

With these objects in mind and others which will become manifest as the description proceeds, reference is to be had to the accompanying drawing in which like reference characters designate like parts in the several views thereof, in which:

FIG. 1 is a perspective view of the pipe tool for removing portions of pipe from fittings;

FIG. 2 is a sectional view taken on line 2—2 of FIG. 3; looking in the direction indicated by the arrows;

FIG. 3 is an elevational view of the mandrel of the pipe tool, one of the pipe engaging elements thereof being removed and showing the interior one of the pipe engaging elements and showing the retracting springs for the pipe engaging elements in cross section;

FIG. 4 is a view similar to FIG. 3, but showing a larger pipe engaging tool on the mandrel, showing a pipe fitting and a portion of pipe thereon in dashed outline, with the tool being shown in position to remove a broken portion of a pipe nipple from the fitting;

FIG. 5 is a fragmentary, sectional view showing an enlarged portion of the threads of the mandrel, and of the pipe engaging element;

FIG. 6 is a perspective view of the tool of the size shown in FIG. 4, but showing a sleeve with tangs thereon telescoped over the mandrel to enable the tool to be turned in either direction with expanding or contracting after the pipe engaging head has engaged the interior of the pipe;

FIG. 7 is a perspective view of the sleeve as shown in FIG. 6, shown apart from the mandrel;

FIG. 8 is an elevational view of the pipe engaging head removed from the mandrel; and FIG. 9 is a perspective view of a circular spring element, which maintains the head segments in retracted position when the mandrel is retracted.

With more specific reference to the drawing, the numeral 1 designates generally a mandrel, which mandrel may be made to fit several different size pipe engaging heads, such as indicated at 2 and 4. The pipe engaging heads embody a plurality of arcuate segments 6, two of which have been shown in the present instance. However, for larger pipe, more segments are used to enable more of the teeth, such as indicated at 8, to engage with the inner wall 10 of a pipe portion 12 so as to enable the pipe portion 12 to be removed from a pipe fitting 14 without damage to the fitting.

The mandrel 1 preferably has a polygonal portion 16 on one end, which portion 16 may be of a size to fit the conventional wrench sockets to enable conventional wrench handles to be used. The other end of the mandrel 1 is screwthreaded as indicated at 18, which threads in the present case are shown to be left hand threads, so as to enable the tool to be used in a pipe portion 10 to automatically expand and grip the interior of the pipe portion upon rotation of mandrel 1. However, in instances where the expansion of the head segments need not be fully expanded, such as in thin wall pipe or in pipe that has rusted to such extent that the threads might be impaired by continued expansion and turning action, a sleeve 20 is slid onto mandrel 1 until tangs 22 engage within notches 24 of the respective pipe engaging heads 2 and 4, whereupon a wrench may be applied to squared portion 16 of mandrel 1, thereby to exert torsion through sleeve 20 to tangs 22, which will enable the turning of the head 2 or 4 in either direction.

In the making up of pipe, which involves the use of short nipples in remote places, such as through a hole in a wall and even places several feet removed from the point of insertion of the pipe nipple into the opening, a conventional socket wrench extension may be applied to the squared end 26 of the sleeve 20 and the tool and pipe nipple moved into place and screwed to the desired tightness, whereupon the tool may be removed by first removing the socket extension which fits the squared portion 26 and then a socket extension which fitted on the polygonal portion 16 of the mandrel 1, whereupon the screwthreaded end 18 of mandrel 1 may be unscrewed sufficient to permit the head segments 6 to retract to enable the removal of the entire tool from the recessed portion, which would otherwise be inaccessible. The squared polygonal portion 16 and squared portion 26 have conventional spring pressed balls 28 and 30 respectively therein, which will prevent accidental removal from the socket in which they are fitted.

The pipe engaging head, as shown in FIGS. 1, 2, and 8, is composed of a cylindrical member which is serrated around the periphery thereof, preferably with longitudinal serrations or teeth which are pointed, so when these serrations are embedded within a pipe nipple 10, by rotating mandrel 1 to the left, the tapered screw 18 will be caused to move along the internal threads 19 of the pipe engaging head which will expand the segments 6 outward as indicated in dashed outline in FIG. 2. As the segments 6 expand arcuate rings 7 within circumferential recesses 9, in the pipe engaging head, will yield to permit the head segments 6 to be moved outward as indicated in dashed outline in FIG. 2. When the mandrel 1 is rotated in the opposite direction, the arcuate rings 7 will contract to move the head segments 6 inward to enable the ready removal of the tool from pipe nipple 10.

The sleeve 20, as shown on the tool in FIG. 6 and as shown apart from the tool in FIG. 7, has a counter bore 27 therein which enables the larger end portion of threads 18 to move into the counter bore when the pipe engaging head is being retracted. It is preferable that the size of the mandrel 1 not be greater than the root diameter of the threads of the screwthreaded end 18 of mandrel 1, which will enable maximum strength to be had in the mandrel without the mandrel size interfering with the threaded portion of threads 19 of the heads 2 and 4.

While only two sizes of heads have been shown in the present drawing, one mandrel may be adapted to fit the head sizes of several different pipe sizes, and likewise the same sleeve may be used on the mandrel for the various head sizes, thereby making the tool economical to use, as only the pipe engaging head need be purchased after the basic tool is bought, to enable the tool to be used on other sizes of pipe.

While only two sizes of pipe heads have been shown, each of which is shown to have only two segments in the head, other heads, particularly for larger sizes of pipe, may be made of any number of segments, such as 3, 4 or even 6, and the segments retained in place by arcuate spring rings such as indicated at 7. The same mandrel can be made to serve heads with any number of segments.

The thread form as shown in FIG. 5 is illustrative of a thread; however other forms of threads are adaptable for such use. It is preferable, however, to have the threads which fit with relatively loose tolerance, and it is also preferable to have the thread form rounded so as the larger threads move downward into the conical portion of the female threads 19, the threads will expand the head segments 6 without the threads digging in or becoming galled, which could occur if close fitting, sharp point threads were used.

While the invention has been described somewhat in detail for removing pipe nipples and broken portions of pipe from pipe fittings and couplings, it is to be understood that it may be used equally as well for screwing these into place, by the use of the tanged sleeve 20 with the tangs 22 engaging the notches 24, which will enable the turning of the pipe in either direction after the head segments 6 have been expanded until the teeth 8 bite into the interior of the pipe nipple 10.

Having thus clearly shown and described the invention, what is claimed as new and desired to be secured by Letters Patent is:

1. An article of manufacture, a tool for rotating pipe, which tool comprises;
   (a) a mandrel,
      (1) an externally screwthreaded end on said mandrel,
         (i) said externally screwthreaded end of said mandrel being tapered toward an apex,
      (2) a complementary, internally screwthreaded, segmental head fitted upon said tapered threads of said mandrel,
      (3) resilient means normally retaining said head in contracted relation on said screwthreads on said mandrel,
         (i) said head having serrations formed exteriorly around the periphery thereof for engaging the interior of a pipe,
      (4) means on said mandrel to operatively receive a torsion applying element,
      (5) said segmental head having a notch formed in the end thereof, adjacent said mandrel,
   (b) a sleeve adapted to be slid over said mandrel in close fitting, guided relation,
      (1) said sleeve having a tang formed on an end thereof, adjacent said segmental head, to complementally engage said notch,
      (2) said sleeve having a counterbore formed therein, in the end thereof, adjacent said tang, which counterbore is of a size and depth to receive the larger end of said tapered threaded portion of said mandrel, when said mandrel is in one position, and
      (3) wrench receiving means on the distal end of said sleeve.

2. A tool for rotating pipe, which tool comprises:
   (a) a mandrel,
      (1) an end of said mandrel having a converging taper formed thereon,
         (i) screwthreads formed on said tapered portion of said mandrel,
   (b) an expansible, pipe engaging head composed of two segments,
      (1) said expansible, segmental, pipe engaging head having a pair of notches formed therein in opposed relation, one notch intermediate the arcuate length of each segment of said segmental head and being adjacent said mandrel,
         (i) said notches being of a depth less than the longitudinal length of said segmental, pipe engaging head,
      (2) resilient means engaging said segments of said segmental, pipe engaging head to normally retain said segments in contracted relation,
      (3) said head having pipe engaging teeth formed on the periphery thereof,
      (4) said expansible, pipe engaging head having a tapered bore formed therein,
      (5) said tapered bore being interiorly screwthreaded to complementally engage the screwthreads of said mandrel,
   (c) a sleeve adapted to slide over said mandrel,
      (1) said sleeve having a pair of tangs formed on an end thereof in opposing relation to complementally engage said pair of notches in said segmental, pipe engaging head,
      (2) said sleeve having a bore formed therein to fit on said mandrel in close fitting, guided relation,
      (3) said sleeve having a counterbore formed therein, in the end thereof, adjacent said tangs, which counterbore is of a size and depth to receive the larger end portion of said threads on said mandrel when said mandrel is in one position,
   (d) wrench receiving means formed on said sleeve on an end thereof opposite said tangs, and (e) means associated with said mandrel for engagement of a torsion applying element.

References Cited by the Examiner

UNITED STATES PATENTS

| | | | |
|---|---|---|---|
| 268,408 | 12/1882 | Jackson | 81—72 |
| 1,390,917 | 9/1921 | Lyon | 81—72 |
| 2,601,419 | 6/1952 | Spahn | 81—72 X |
| 2,678,217 | 5/1954 | King | 81—72 |
| 3,201,158 | 8/1965 | Meripol | 81—72 X |

FOREIGN PATENTS

| | | |
|---|---|---|
| 558,673 | 5/1923 | France. |
| 118,085 | 10/1918 | Great Britain. |

WILLIAM FELDMAN, *Primary Examiner.*

JAMES L. JONES, Jr., *Examiner.*